United States Patent
Keenan et al.

(10) Patent No.: US 11,130,281 B2
(45) Date of Patent: Sep. 28, 2021

(54) HEATING TECHNIQUES IN ADDITIVE FABRICATION AND RELATED SYSTEMS AND METHODS

(71) Applicant: Formlabs, Inc., Somerville, MA (US)

(72) Inventors: Justin Keenan, Lexington, MA (US); Brendan Pratt, Somerville, MA (US); Maxim Lobovsky, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 199 days.

(21) Appl. No.: 16/285,477

(22) Filed: Feb. 26, 2019

(65) Prior Publication Data
US 2019/0263055 A1 Aug. 29, 2019

Related U.S. Application Data

(60) Provisional application No. 62/635,442, filed on Feb. 26, 2018.

(51) Int. Cl.
*B29C 64/153* (2017.01)
*B29C 64/268* (2017.01)
(Continued)

(52) U.S. Cl.
CPC .......... *B29C 64/153* (2017.08); *B29C 64/268* (2017.08); *B29C 64/286* (2017.08);
(Continued)

(58) Field of Classification Search
CPC .......... B22F 10/20; B22F 10/28; B22F 12/10; B22F 12/13; B29C 64/129; B29C 64/153;
(Continued)

(56) References Cited

U.S. PATENT DOCUMENTS

2003/0152756 A1* 8/2003 Yamada ............... B23K 26/066
428/210
2004/0008343 A1* 1/2004 Pawluczyk .......... G02B 5/0278
356/243.1

(Continued)

FOREIGN PATENT DOCUMENTS

CN 203963875 U 11/2014
WO WO 2016/142398 A1 9/2016

OTHER PUBLICATIONS

International Search Report and Written Opinion for International Application No. PCT/US2019/019559 dated May 7, 2019.

*Primary Examiner* — Joseph S Del Sole
*Assistant Examiner* — Manley L Cummins, IV
(74) *Attorney, Agent, or Firm* — Wolf, Greenfield & Sacks, P.C.

(57) ABSTRACT

Substantially equal amounts of thermal energy may be provided over a build area of an additive fabrication device using as few as one heat source by selectively attenuating thermal energy emitted by the heat source. The thermal energy may be selectively attenuated by a structure that blocks portions of the thermal energy from being directly incident upon the build area such that the heat is normalized over the build area. The heat distribution over the build area may, in some embodiments, approximate the heat distribution produced by a flat field heating element, yet may be produced at comparatively lower cost and with less complex engineering.

15 Claims, 6 Drawing Sheets

(51) Int. Cl.
  *B29C 64/295* (2017.01)
  *B29C 64/286* (2017.01)
  *B33Y 30/00* (2015.01)
  *B33Y 10/00* (2015.01)

(52) U.S. Cl.
  CPC ............ *B29C 64/295* (2017.08); *B33Y 10/00* (2014.12); *B33Y 30/00* (2014.12)

(58) Field of Classification Search
  CPC ... B29C 64/268; B29C 64/286; B29C 64/295; B33Y 10/00; B33Y 30/00; G03F 7/0002
  See application file for complete search history.

(56) References Cited

U.S. PATENT DOCUMENTS

| | | | |
|---|---|---|---|
| 2004/0131158 A1* | 7/2004 | Hoheisel | G21K 1/10 378/154 |
| 2006/0115052 A1* | 6/2006 | Hoheisel | G21K 1/10 378/154 |
| 2013/0001834 A1* | 1/2013 | El-Siblani | B29C 64/106 264/401 |
| 2014/0112431 A1* | 4/2014 | Mattson | A61B 6/4035 378/16 |
| 2017/0057174 A1 | 3/2017 | Megretski et al. | |

* cited by examiner

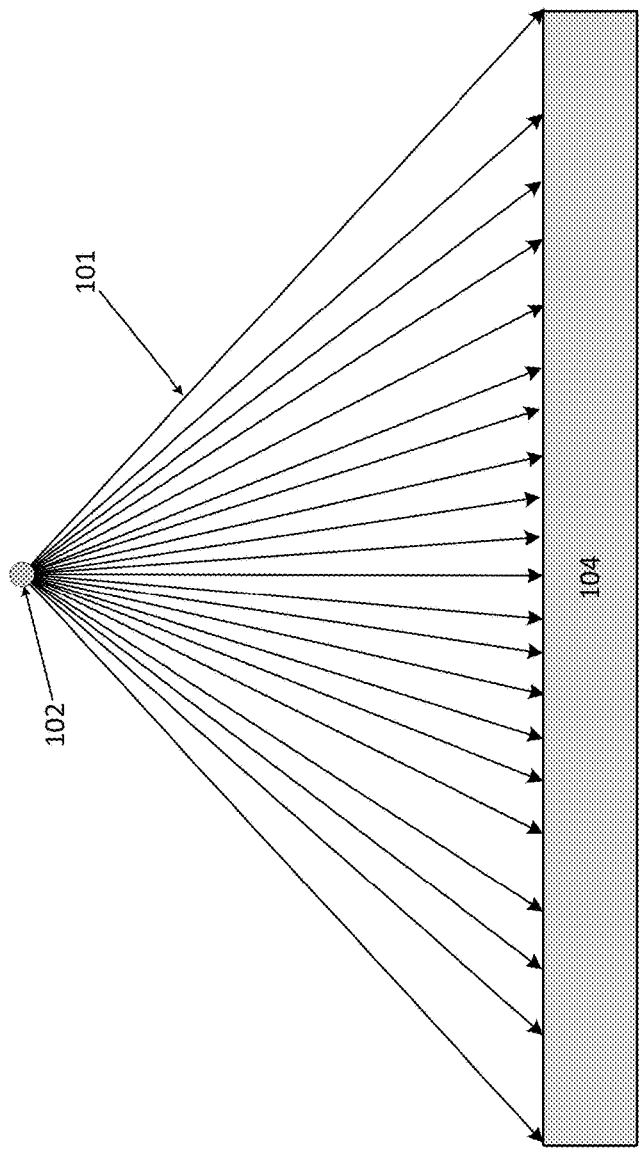
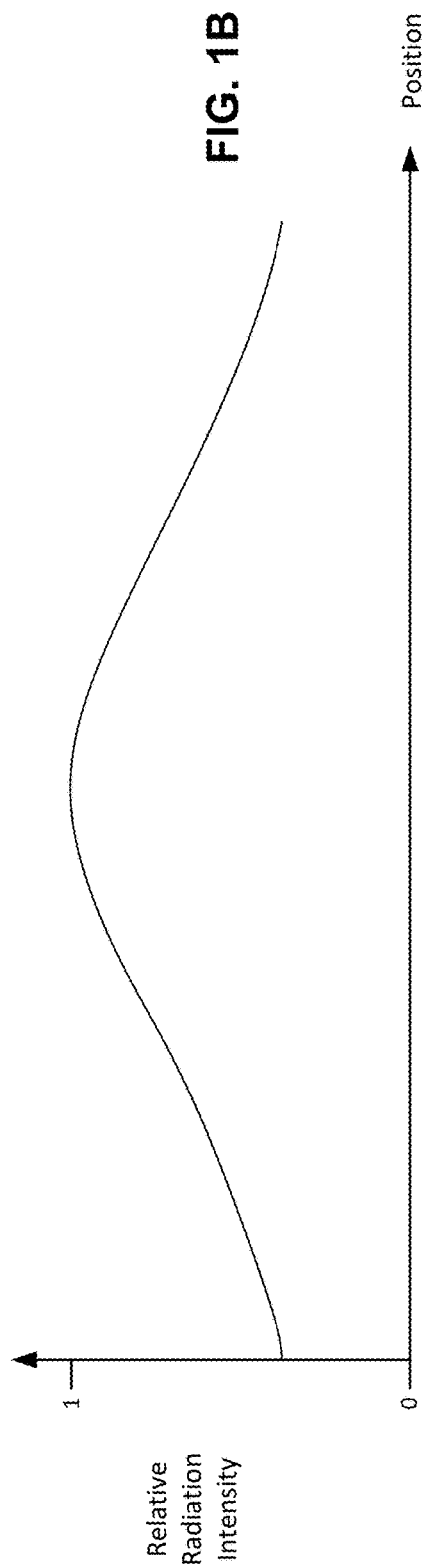
FIG. 1A
FIG. 1B

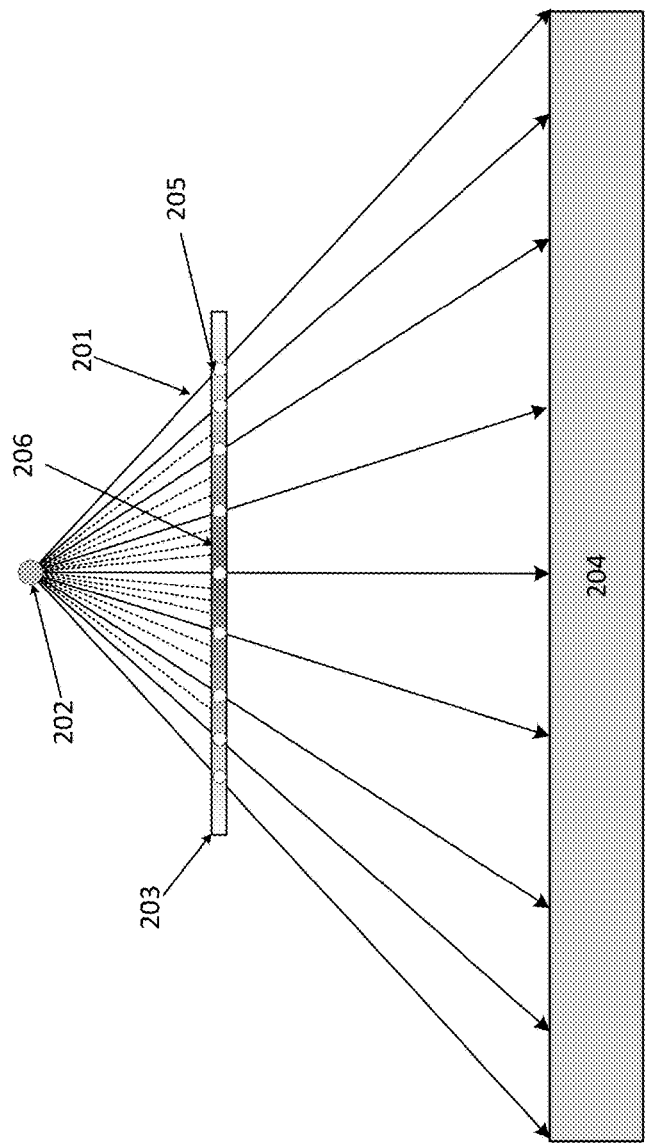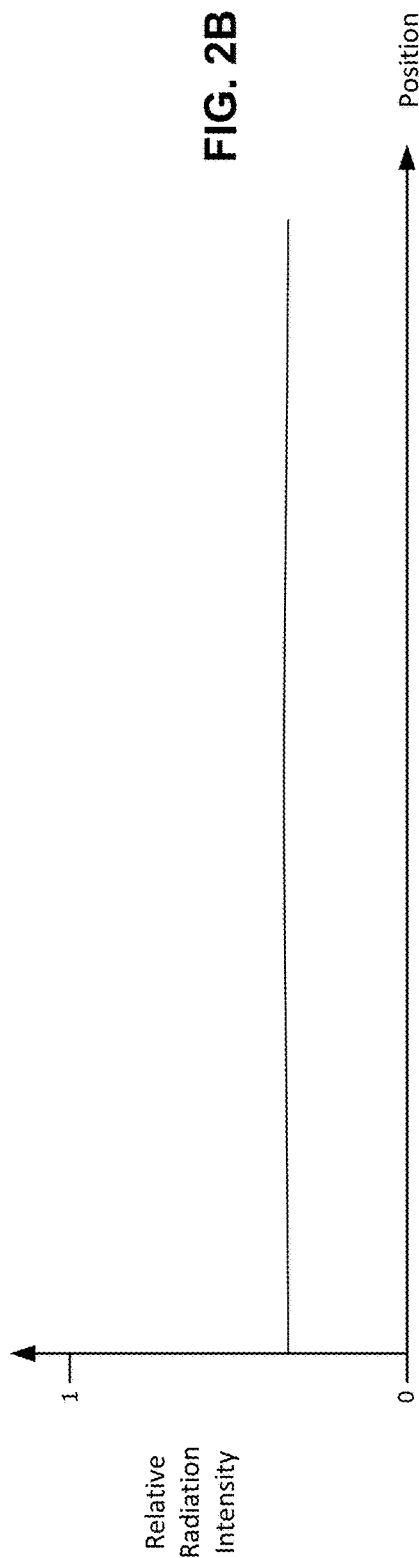

HEATING TECHNIQUES IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 62/635,442, filed Feb. 26, 2018, titled "Heating Techniques In Additive Fabrication And Related Systems And Methods," which is hereby incorporated by reference in its entirety.

BACKGROUND

Additive fabrication, e.g., 3-dimensional (3D) printing, provides techniques for fabricating objects (also referred to as "parts") by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, selective laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as selective laser sintering, or "SLS," solid objects are created by successively forming thin layers by selectively fusing together powdered material. One illustrative description of selective laser sintering may be found in U.S. Pat. No. 4,863,538, incorporated herein in its entirety by reference.

SUMMARY

According to some aspects, an additive fabrication device configured to fabricate objects by forming layers of solid material from a source material is provided, the additive fabrication device comprising a build region into which source material may be disposed, at least one source of electromagnetic radiation configured to direct radiation onto the source material in the build region to thereby form a layer of solid material from the source material, a first heater configured to direct thermal radiation onto at least a first portion of the source material in the build region, and a first thermal attenuation structure arranged between the first heater and the build region, the first thermal attenuation structure formed from a solid material having a plurality of apertures therein, wherein a density of apertures of the first thermal attenuation structure proximate to the first heater is lower than a density of apertures of the first thermal attenuation structure distal to the first heater.

According to some aspects, a method of additive fabrication is provided, the method comprising depositing a source material into a build region, directing thermal radiation, using a first heater, onto at least some of the source material in the build region, wherein a first thermal attenuation structure is arranged between the first heater and the build region, the first thermal attenuation structure formed from a solid material having a plurality of apertures therein, wherein a density of apertures of the first thermal attenuation structure proximate to the first heater is lower than a density of apertures of the first thermal attenuation structure distal to the first heater, and directing radiation, using at least one source of electromagnetic radiation, onto the source material in the build region to thereby form a layer of solid material from the source material.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 1A illustrates a radiative heating element producing heat upon a plane, according to some embodiments;

FIG. 1B illustrates relative radiation intensity across the plane of FIG. 1A, according to some embodiments;

FIG. 2A illustrates a radiative heating element producing heat upon a plane with an intervening selective thermal attenuation structure, according to some embodiments;

FIG. 2B illustrates relative radiation intensity across the plane of FIG. 2A, according to some embodiments;

DETAILED DESCRIPTION

Figure 3:
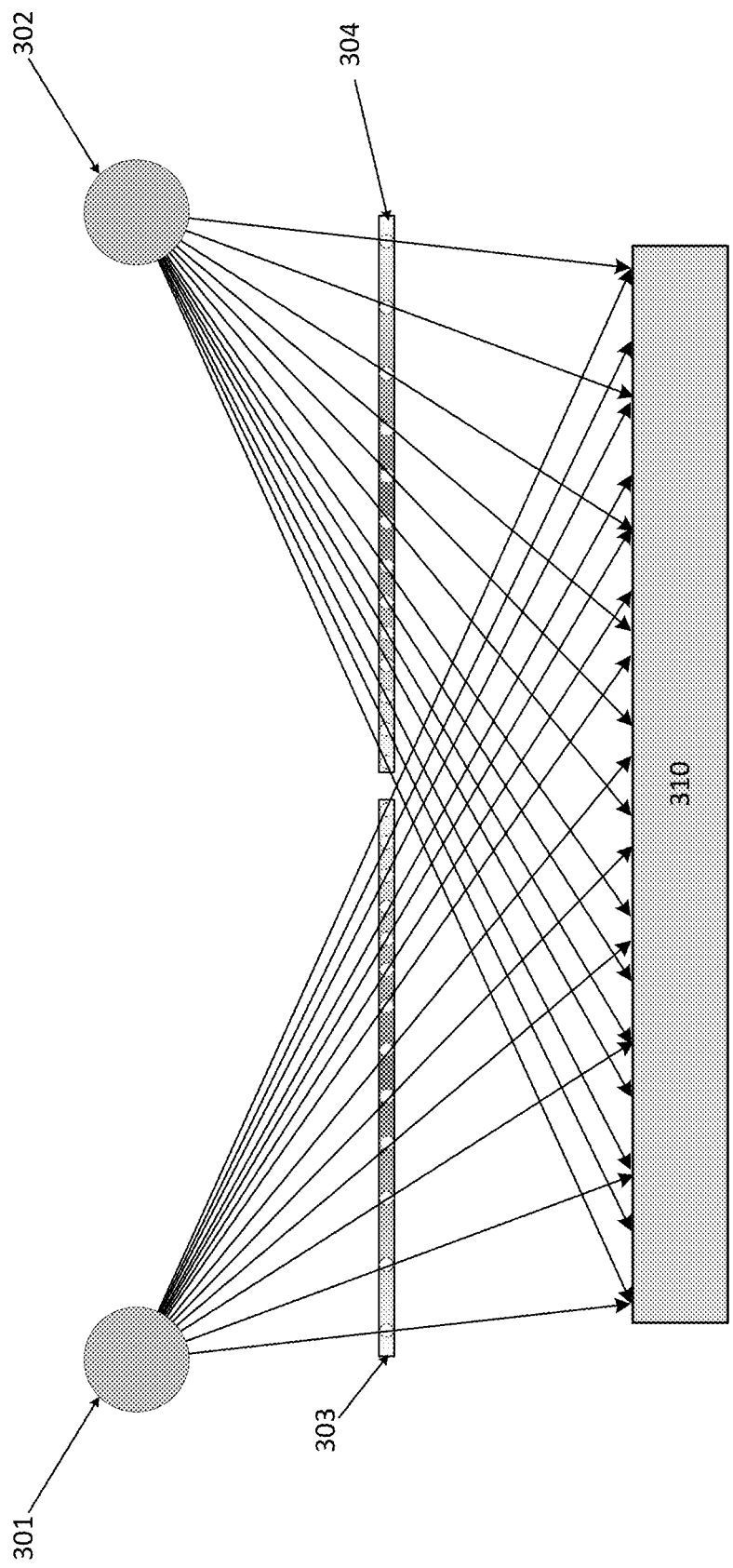
FIG. 3 illustrates two radiative heating elements producing heat upon a plane with intervening selective thermal attenuation structures, according to some embodiments.

Some additive fabrication techniques, such as Selective Laser Sintering (SLS), form parts by fusing fine source material, such as one or more powders, together into larger solid masses. This process of fusing a source material is referred to herein as "consolidation," and typically occurs by directing sufficient energy (e.g., heat and/or light) to the material to cause consolidation. Some energy sources, such as lasers, allow for direct targeting of energy into a small area or volume. Other energy sources, such as heat beds or heat lamps, direct energy into a comparatively broader area or volume of material. Since consolidation of source material typically occurs at or above a critical temperature, producing parts as intended requires effective management of temperature within the source material.

Some additive fabrication devices form a part via sintering techniques from a plurality of layers by first depositing a layer of unconsolidated material onto a fabrication bed and then heated in desired locations within a build region of the bed to consolidate regions of the layer. An additional layer of unconsolidated material is then deposited onto the fabrication bed over the first layer and further regions consolidated, and so forth until the part is formed.

In some additive fabrication systems, the unconsolidated source material is preheated to a temperature that is sufficiently high so as to require minimal additional energy exposure to trigger consolidation. For instance, some systems utilize radiating heating elements that aim to consistently and uniformly heat both the uppermost layer and the volume of the material to a temperature below, but close to, the critical temperature for consolidation. A laser beam or other energy source directed at the material may then provide sufficient energy to reach the critical temperature and thereby cause consolidation. However, maintaining an elevated temperature in this manner prior to consolidation, sometimes referred to as "preheating," poses numerous technical challenges.

Consistency of the temperature of preheated unconsolidated material may be critical to the successful fabrication of parts using the selective sintering process. In particular, the system should preferably maintain the temperature of the preheated unconsolidated material at as close to a constant temperature as feasible so that the total amount of energy actually delivered to an area of unconsolidated material can be predicted for a given energy exposure amount. Additionally, when consolidating the material, the system should preferably maintain the temperature of the material at or above its consolidation temperature for a sufficient time for the consolidation process to complete. Moreover, underheating of the material during fabrication may result in a failure of the material to consolidate and/or may result in inferior material properties within the fabricated part.

Heating regions of powder at inconsistent temperatures, or allowing such regions to subsequently cool at inconsistent rates, may result in significantly different degrees of expansion and contraction due to the thermal energy and subsequent melting and consolidation. These differential expansions and contractions may cause numerous part defects, including cracking, incomplete consolidation, and warping. Inconsistent temperature at layers near to the surface of the powder bed, or at the powder bed surface, may be particularly troublesome, causing newly formed layers to warp, curling up and preventing the formation of additional layers and resulting in part failure. Referred to herein as "thermal shock," such effects may be most pronounced when relatively cool regions are in immediate proximity to relatively hot regions of the powder bed, thus forming an undesirable temperature gradient between the cooler and warmer regions.

As a result of the above factors, consistent and even preheating of the unconsolidated material is highly desirable.

Conventional systems sometimes utilize a single radiative heat source and aim to apply heat from this source evenly over the build region. The amount of thermal energy applied depends strongly on the distance from the heat source to the build region, however, typically following an inverse square law. As radiative sources are typically mounted above the build region, this property of radiative heating limits the effectiveness of a single heat source significantly.

Other conventional systems instead incorporate multiple radiative heat sources, configured to primarily direct thermal radiations to subsections of the surface area of the build region (the "build area"). By limiting the extent of the build area heated by any one radiative heat source, "edge" effects caused by differences in distance and incident angle of the thermal radiation upon the build area may be reduced. The use of multiple heating elements, however, presents a number of additional challenges. For instance, each heating element may require independent position and output calibration in order to ensure consistent heat production. Moreover, such calibrations may tend to "drift" over time at varying rates, and such calibration may require substantial time and additional components to be incorporated into the system to allow for field calibration. The positioning of heaters also becomes crucial in order to avoid overlapping areas between heaters causing hot "spots," or gaps between heaters causing cold "spots." In some systems, sophisticated "closed loop" control systems have been implemented, monitoring the temperature of each subsection of the build area and individually controlling the heater responsible for that subsection, but such an approach increases the cost and complexity substantially, while still not fully addressing edge effects between neighboring radiative heating elements.

Yet other conventional systems incorporate a "flat" heating element. In such systems, a large thermal mass, such as a substantially flat iron plate, may be heated by various sources such that a desired amount of thermal energy is radiated from the flat plate onto the build region. In systems where the size of the flat plate is the same or close to the build area, it may thereby be possible to apply a substantially consistent level of heat to this area. Such a flat plate, however, poses numerous challenges. In addition to simple weight and space requirements, the amount of time needed to heat and cool such a plate is significant, causing process delays and reducing the rate at which temperatures may be adjusted during operation.

The inventors have recognized and appreciated that substantially equal amounts of thermal energy may be provided over a build area using as few as one heat source by selectively attenuating thermal energy emitted by the heat source. The thermal energy may be selectively attenuated by a structure that blocks portions of the thermal energy from being directly incident upon the build area such that the heat is normalized over the build area. The heat distribution over the build area may, in some embodiments, approximate the heat distribution produced by a flat field heating element, yet may be produced at comparatively lower cost and with less complex engineering.

According to some embodiments, a heat source of an additive fabrication device may be a radiative heat source, such as an infrared heater. The thermal attenuation structure may include a number of apertures through which radiation from the heat source may pass, whereas radiation from the heat source incident on other regions of the structure may be attenuated or blocked. Attenuated radiation may, in some embodiments, cause heating of the thermal attenuation structure, which may in turn cause the structure to act as a secondary source of heat through convection. In some embodiments, such convective heat may provide a component of heat that, coupled with the radiative heat propagating through the thermal attenuation structure, produces a uniform heat distribution on the build region. In other embodiments, the convective heat may be a negligible source of heat or may otherwise not significantly contribute to a uniform heat distribution produced by the radiative heat propagating through the thermal attenuation structure.

According to some embodiments, a thermal attenuation structure may include a plurality of apertures, being regions of the structure that do not attenuate incident thermal radiation, and which may have any suitable size(s) and/or shape(s). As discussed above, a thermal attenuation structure may include regions that attenuate incident thermal radiation more than other regions of the structure, and by selecting a suitable attenuation amount for each portion of the structure, a uniform heat distribution may be produced on a build region. Variation of the degree of attenuation across the thermal attenuation structure may be accomplished by, for example, varying the number density of apertures and/or varying the size and/or shape of apertures of the thermal attenuation structure.

According to some embodiments, a thermal attenuation structure may include a plurality of regions that attenuate thermal radiation less than other regions. For instance, a thinner region of the structure may attenuate the radiation, but to a lesser degree from thicker regions of the structure. In some embodiments, a thermal attenuation structure may include a plurality of pits or other indents such that radiation incident on the pits is attenuated but propagates to the build region, whereas other, non-pit regions of the structure, attenuate the incident radiation to a greater degree.

According to some embodiments, a thermal attenuation structure may be planar. A planar structure may be simpler to manufacture and install than a non-planar structure, although in general a thermal attenuation structure may exhibit any suitable shape such that it attenuates thermal energy from one or more heaters to produce a uniform heat distribution in a build region.

Following below are more detailed descriptions of various concepts related to, and embodiments of, techniques for heating material in sintering additive fabrication devices. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIGS. 1A-1B and 2A-2B illustrate how a thermal attenuation structure may selectively attenuate thermal energy and thereby produce a uniform heating distribution on a build area. FIG. 1A illustrates a radiative heat source producing heat upon a plane, according to some embodiments. Heating element 102 produces thermal energy 101 and is incident upon the build region 104, the upper surface of which is referred to herein as the build area. FIG. 1B illustrates the relative radiation intensity across the build area as a function of position. As shown, because the amount of thermal energy produced by the radiative heat source decreases with distance from the heat source (e.g., according to an inverse square law), the part of the build area directly under the radiative heat source receives a comparatively higher intensity of thermal radiation compared with the exterior portions of the build area. This configuration leads to uneven heating of a build area, and can cause numerous problems in successful additive fabrication as discussed above.

In comparison, FIG. 2A illustrates a radiative heat source producing heat upon a plane with an intervening selective thermal attenuation structure, according to some embodiments. In FIG. 2A, thermal radiation 201 is emitted from a radiative heat source 202. A thermal attenuation structure 203 is arranged between the radiative heat source and the build region 204 and includes a plurality of apertures including aperture 205 that cause selective attenuation of the thermal radiation that would otherwise be incident upon the build area. Such apertures 205 allow a portion of the radiative heat emitted by the heat source 202 to pass through the thermal attenuation structure 203 and reach the build region 204. The remaining portion of the radiative heat may be absorbed or reflected by the thermal attenuation structure, or otherwise restricted in reaching the build area 204. Depending on the number and dimension of apertures 205 within the partial barrier 203, the total amount of radiative heat reaching the build region 204 may be attenuated or otherwise reduced. As shown in the example of FIG. 2A, a greater number of apertures are present towards the exterior of the thermal attenuation structure compared with the center of the structure. As a result, the relative radiation intensity across the build area may be normalized to be substantially uniform as shown in FIG. 2B.

According to some embodiments, the number, spacing, shape and/or dimensions of the apertures of thermal attenuation structure 203 may vary across the structure. By varying any one or more of these characteristics, an aperture density may be adjusted and thereby it is possible to selectively attenuate the amount of radiative heat reaching different portions of the build area from the radiative heat source 202.

According to some embodiments, radiative heat 206 blocked or otherwise attenuated by the thermal attenuation structure 203 may be absorbed, reflected, or otherwise dissipated or redirected by the structure. In some embodiments, attenuated thermal energy may be repurposed for providing additional ambient and/or diffuse heating. For instance, thermal energy by the thermal attenuation structure may cause the temperature of the structure to rise, which may cause the structure to re-radiate thermal energy, thereby causing convective heating of the surrounding environment. Such embodiments may thereby provide for a virtual flat field heating element particularly advantageous for use in additive manufacturing applications.

According to some embodiments, radiative heat source 202 may comprise an infrared heater. For instance, radiative heat source 202 may include one or more heat lamps, metal wire elements, ceramic infrared heaters, quartz heat lamps, carbon heaters or combinations thereof. It will be appreciated that while radiative heat source 202 is illustrated in FIG. 2A as a point source, a radiative heat source will in general have a size that emits thermal radiation from across one or more surfaces and that the dimensions of such surfaces may be considered when determining a suitable configuration for thermal attenuation structure.

In some embodiments, radiative heat source 202 may be additionally utilized to form material in an additive fabrication process. As one example, certain additive manufacturing techniques may apply actinic radiation, such as ultraviolet light, in order to cause photopolymer curing reactions within selectively deposited material. As in the application of heat, the application of such actinic radiation may advantageously be provided to a build area in a substantially uniform manner using the techniques disclosed herein. As such, a radiative heat source in an additive fabrication device may be configured to perform two functions—to heat a build region and additionally to form solid material in said build region. In some embodiments, the radiative heat source may be operated in a different manner (e.g., at a different power level) when performing each of these functions.

Thermal attenuation structure 203 may be formed of a number of suitable materials, including various types of steel or aluminum, ceramic, or combinations thereof.

While FIG. 2A illustrates a thermal attenuation structure that includes apertures in the form of through holes, it will be appreciated that attenuation may be achieved in various ways and that the illustrated structure is not the only approach to attenuating thermal radiation. For instance, a thermal attenuation structure may comprise a bulk material with comparatively transmissive properties, such as a glass pane, on which one or more attenuating features, such as blocking decals, are applied. In some embodiments, a thermal attenuation structure may attenuate thermal radiation via absorptive coatings, variable densities of meshes, and/or other techniques that may not require discrete attenuating or transmitting features.

Moreover, while FIG. 2A illustrates a single heat source 202, alternative embodiments may utilize multiple heat sources 202 in order to provide for a more efficient application of heat to the build area 204. FIG. 3 illustrates an example of one such configured in which two radiative heating elements are arranged with intervening selective thermal attenuation structures.

In the example of FIG. 3, radiative heat sources 301 and 302 are positioned on opposing sides of a build region 310. Thermal attenuation structures 303 and 304 are positioned such that radiation from respective heat sources is selectively attenuated to produce a substantially uniform heat distribution across the surface of the build region. Although two thermal attenuation structures 303 and 304 are illustrated in the example of FIG. 3, it will be appreciated that a single structure producing the same result could equally be utilized instead of the two structures (that is, a structure with a greater aperture density at its center and a smaller aperture density at the perimeter).

Figure 4:
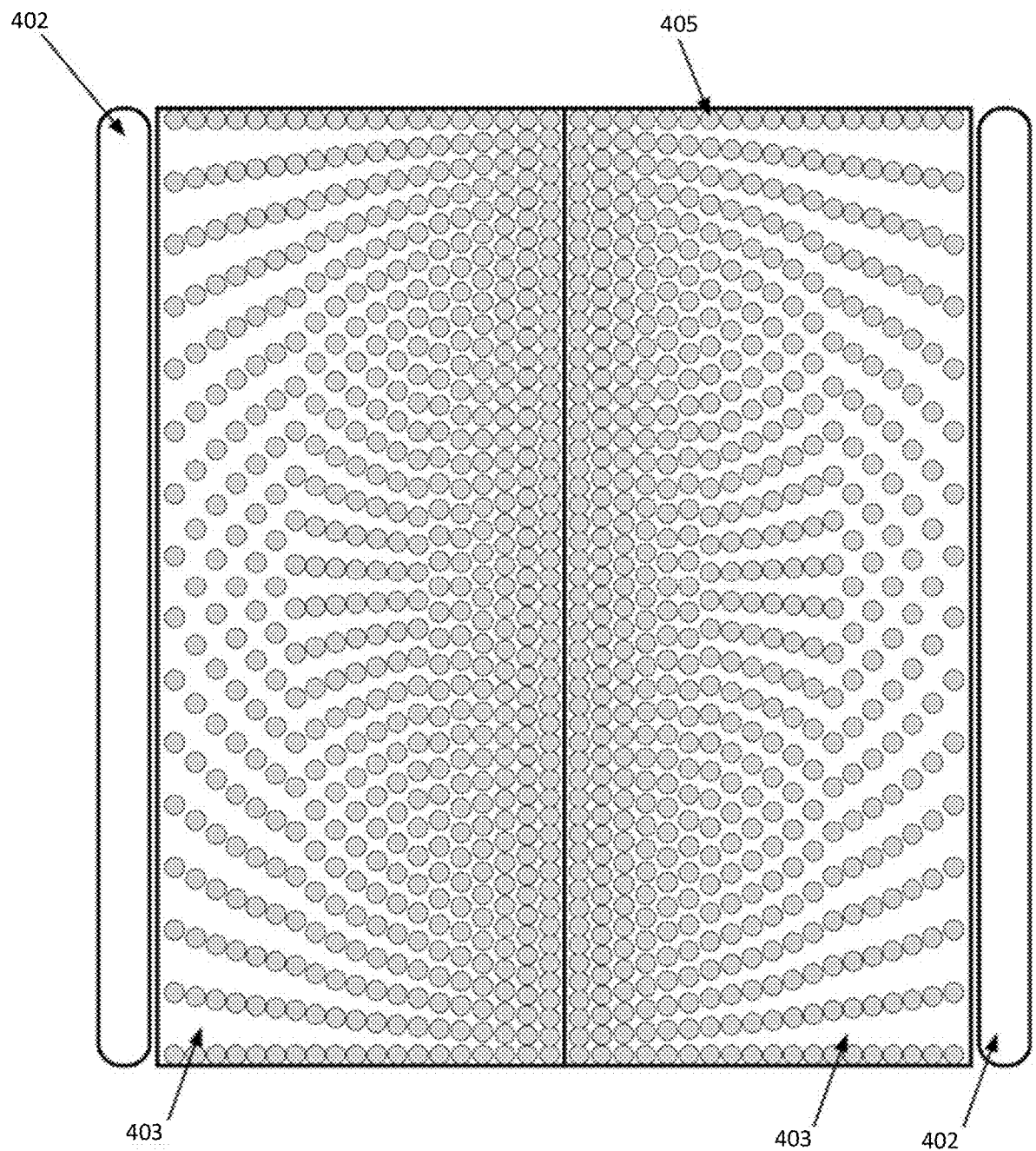
FIG. 4 depicts an illustrative thermal attenuation structure, according to some embodiments.

In some embodiments, a radiative heat source may include a linear heat source, such as a tube heater. FIG. 4 illustrates an example of a thermal attenuation structure that may be utilized in an additive fabrication device in such embodiments. FIG. 4 depicts linear heat sources 402 and a thermal attenuation structure 403 from a view above the build region, facing toward the build region.

In the example of FIG. 4, two linear heat sources 402, such as quartz tube heaters, are elevated above the build area (not pictured) at opposing sides. A thermal attenuation structure 403 positioned relative to each heater may equalize the amount of thermal energy per unit area reaching the build area. As discussed above in regards to FIG. 2A, this may be achieved by varying the density of apertures 405 across the barrier 403, such that comparatively more energy is blocked at regions closer to the heater 402 than those further away, thus selectively attenuating thermal energy that would otherwise intersect the build area closer to the linear heat source and preferentially allowing thermal energy to pass to areas further from the linear heat source 402.

Figure 5:
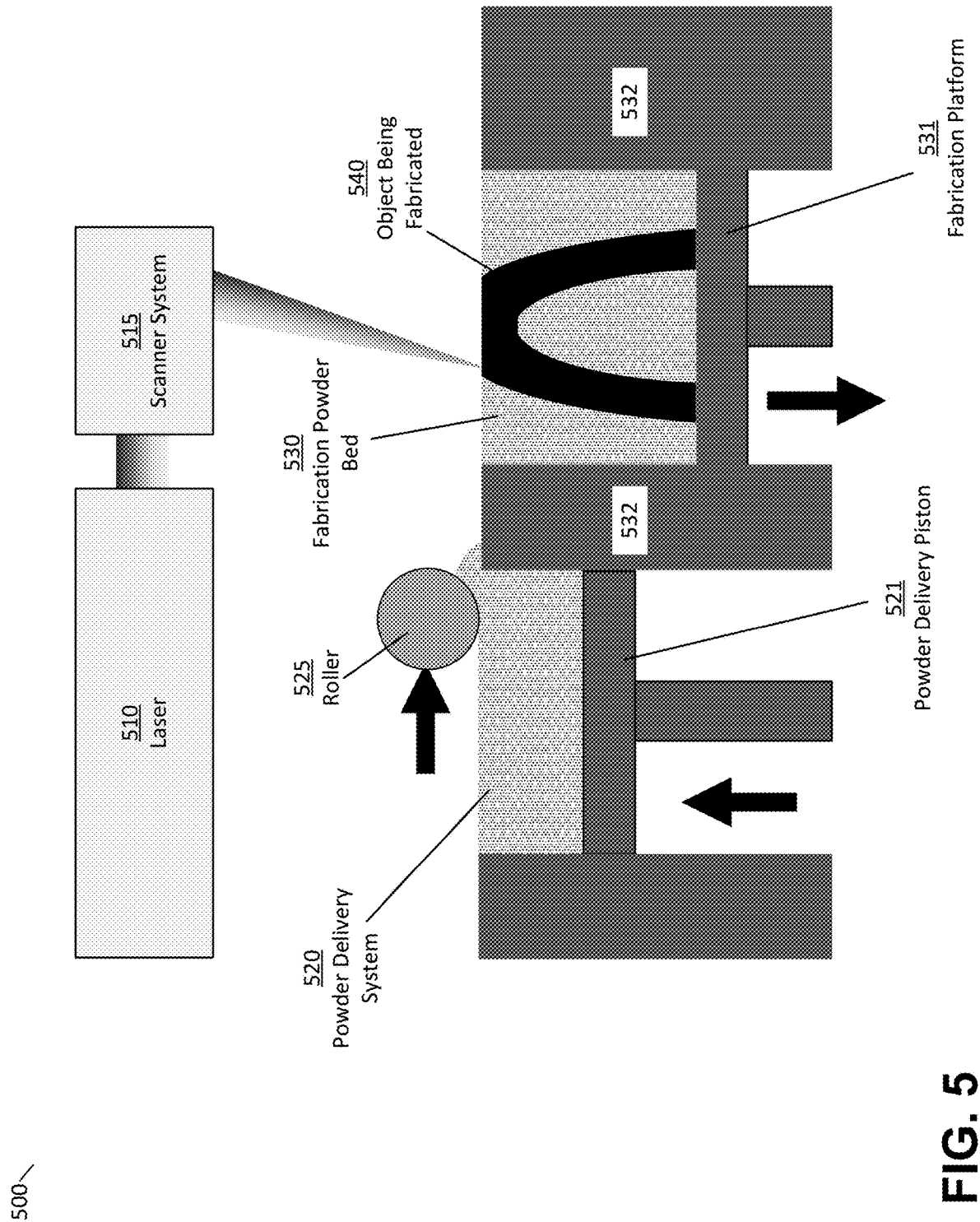
FIG. 5 depicts a selective laser sintering system, according to some embodiments.

To provide an example of one type of additive fabrication device in which the above-described techniques may be employed, an illustrative conventional selective laser sintering (SLS) additive fabrication device is illustrated in FIG. 5. In the example of FIG. 5, SLS device 500 comprises a laser 510 paired with a computer-controlled scanner system 515 disposed to operatively aim the laser 510 at the fabrication bed 530 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 5, the material in the fabrication bed 530 is selectively heated by the laser in a manner that causes the powder material particles to fuse (sometimes also referred to as "sintering" or "consolidating") such that a new layer of the object 540 is formed. SLS is suitable for use with many different powdered materials, including any of various forms of powdered nylon. In some cases, areas around the fabrication bed (e.g., the walls 532, the platform 531, etc.) may include heating elements to heat the powder in the fabrication bed. Such heaters may be used to preheat unconsolidated material, as discussed above, prior to consolidation via the laser.

Once a layer has been successfully formed, the fabrication platform 531 may be lowered a predetermined distance by a motion system (not pictured in FIG. 5). Once the fabrication platform 531 has been lowered, the material deposition mechanism 525 may be moved across the fabrication bed 530, spreading a fresh layer of material across the fabrication bed 530 to be consolidated as described above. Mechanisms configured to apply a consistent layer of material onto the fabrication bed may include the use of wipers, rollers, blades, and/or other levelling mechanisms for moving material from a source of fresh material to a target location.

Since material in the powder bed 530 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be printed with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate so as to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent fabrication. As discussed above, it is highly desirable in a system such as system 500 shown in FIG. 5 to wait for unconsolidated material that is delivered onto the fabrication bed to reach a consistent temperature before consolidating the material with the laser.

Figure 6:
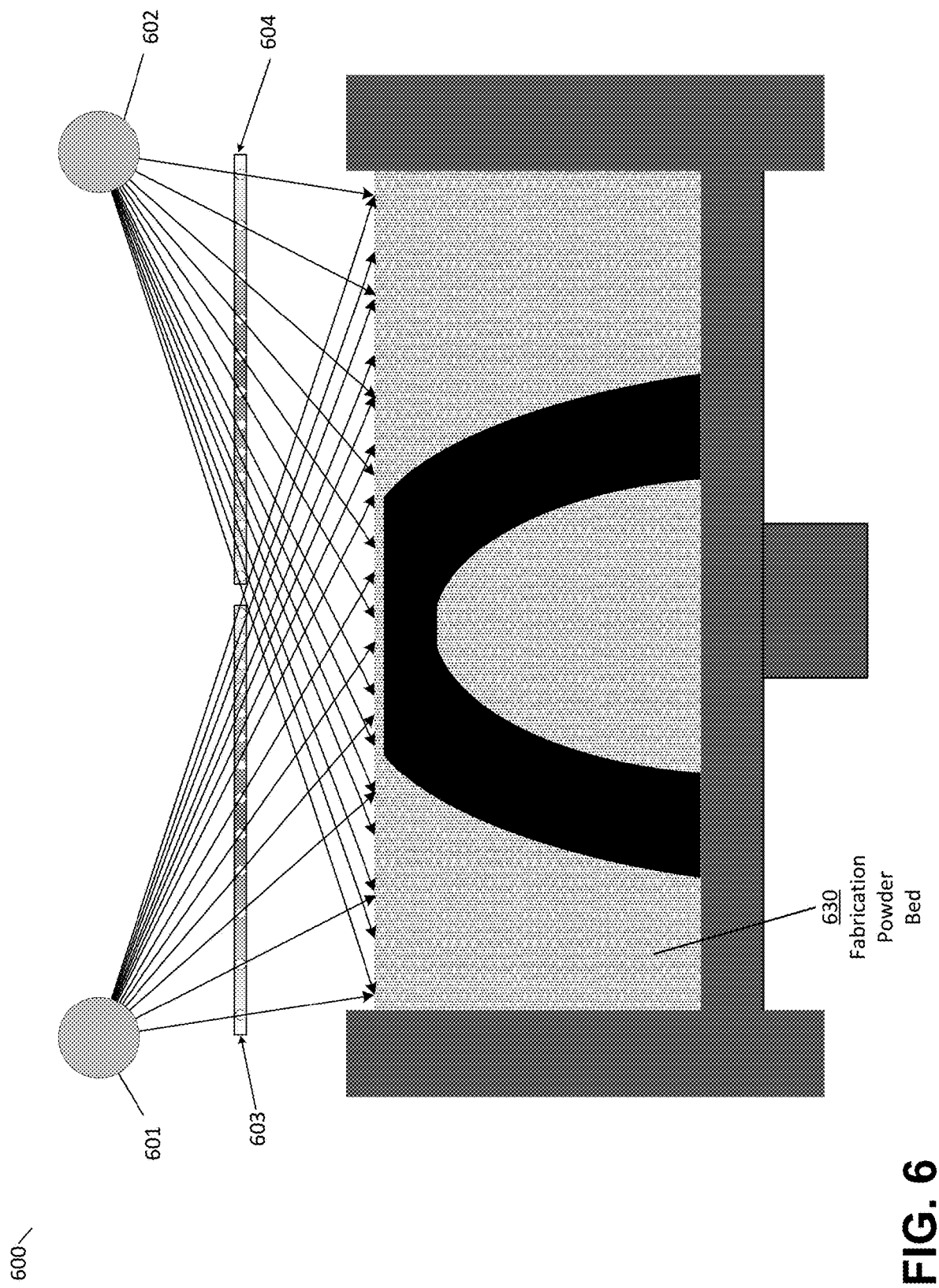
FIG. 6 depicts a portion of an illustrative selective laser sintering system including radiative heating elements and selective thermal attenuation structures, according to some embodiments.

FIG. 6 depicts a portion of an illustrative selective laser sintering system of FIG. 5 that includes radiative heating elements and selective thermal attenuation structures, according to some embodiments. In the example of FIG. 6, only a portion of a selective laser sintering additive fabrication device is illustrated for clarity. It will be appreciated that system 600 may include any components shown in FIG. 5 in addition to those shown in FIG. 6.

In the example of FIG. 6, radiative heaters 601 and 602 are positioned on opposing sides of the build region. Thermal attenuation structures 603 and 604 are positioned such that radiation from respective heat sources is selectively attenuated to produce a substantially uniform heat distribution across the surface of the build region. Although two thermal attenuation structures 603 and 604 are illustrated in the example of FIG. 6, it will be appreciated that a single structure producing the same result could equally be utilized instead of the two structures (that is, a structure with a greater aperture density at its center and a smaller aperture density at the perimeter).

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within 20% of one another in some embodiments, within 10% of one another in some embodiments, within 5% of one another in some embodiments, and yet within 2% of one another in some embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to fabricate objects by forming layers of solid material from a source material, the additive fabrication device comprising:
    a build region into which source material may be disposed;
    at least one source of electromagnetic radiation configured to direct radiation onto the source material in the build region to thereby form a layer of solid material from the source material;
    a first heater configured to direct thermal radiation onto at least a first portion of the source material in the build region; and
    a first thermal attenuation structure arranged between the first heater and the build region, the first thermal attenuation structure formed from a solid material having a plurality of apertures therein, wherein a density of apertures of the plurality of apertures within a first region of the first thermal attenuation structure that is proximate to the first heater is lower than a density of apertures of the plurality of apertures within a second region of the first thermal attenuation structure that is distal to the first heater.

2. The additive fabrication device of claim 1, further comprising a material deposition mechanism configured to move over the build region and to deposit source material onto the build region.

3. The additive fabrication device of claim 1, further comprising a second heater configured to direct thermal radiation onto at least a second portion of the source material in the build region.

4. The additive fabrication device of claim 3, further comprising a second thermal attenuation structure arranged between the first heater and the build region and/or between the second heater and the build region.

5. The additive fabrication device of claim 1, wherein the at least one source of electromagnetic radiation includes a laser.

6. The additive fabrication device of claim 1, wherein the first thermal attenuation structure is planar.

7. The additive fabrication device of claim 1, wherein the first thermal attenuation structure comprises metal.

8. The additive fabrication device of claim 1, wherein the plurality of apertures of the first thermal attenuation structure includes a plurality of circular holes.

9. The additive fabrication device of claim 1, wherein the first thermal attenuation structure comprises a mesh structure and wherein the plurality of apertures of the first thermal attenuation structure are gaps of the mesh structure.

10. The additive fabrication device of claim 1, wherein the plurality of apertures have a plurality of different sizes.

11. The additive fabrication device of claim 1, wherein the first heater is an infrared tube heater.

12. The additive fabrication device of claim 1, wherein the thermal radiation directed from the first heater onto the build region and attenuated by the first thermal attenuation structure is incident on the build region with a uniform intensity distribution.

13. A method of additive fabrication, the method comprising:
    depositing a source material into a build region;
    directing thermal radiation, using a first heater, onto at least some of the source material in the build region, wherein a first thermal attenuation structure is arranged between the first heater and the build region, the first thermal attenuation structure formed from a solid material having a plurality of apertures therein, wherein a density of apertures of the plurality of apertures within a first region of the first thermal attenuation structure that is proximate to the first heater is lower than a density of apertures of the plurality of apertures within a second region of the first thermal attenuation structure that is distal to the first heater; and directing radiation, using at least one source of electromagnetic radiation, onto the source material in the build region to thereby form a layer of solid material from the source material.

14. The method of claim 13, wherein depositing the source material comprises controlling a material deposition mechanism to move over the build region and to deposit source material onto the build region.

15. The method of claim 13, wherein directing the thermal radiation onto the build region comprises attenuating the thermal radiation by the first thermal attenuation structure such that thermal radiation is incident on the build region with a uniform intensity distribution.

* * * * *